May 24, 1938. A. H. HABERSTUMP ET AL 2,118,556
TRAVELING REEL
Filed March 11, 1936
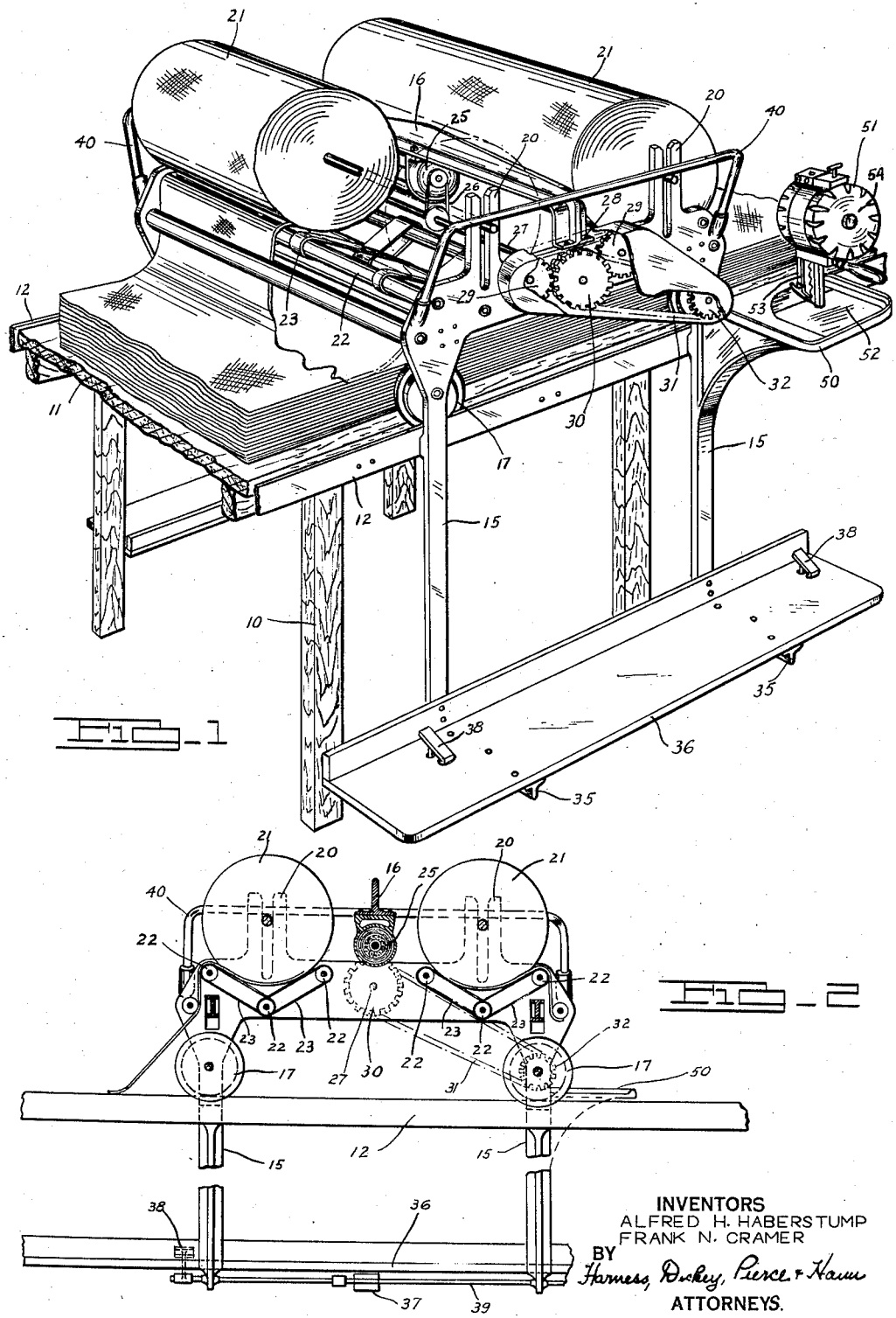
INVENTORS
ALFRED H. HABERSTUMP
FRANK N. CRAMER
BY Harness, Dickey, Pierce & Ham
ATTORNEYS.

Patented May 24, 1938

2,118,556

UNITED STATES PATENT OFFICE 2,118,556

TRAVELING REEL

Alfred H. Haberstump and Frank N. Cramer, Detroit, Mich., assignors to The Murray Corporation of America, a corporation of Delaware Application March 11, 1936, Serial No. 68,161

3 Claims. (Cl. 270—31)

This invention relates to apparatus for distributing a layer of fabric material upon a work table. More particularly it relates to apparatus which is particularly adaptable for applying superimposed layers of fabric material on a work table, in order that suitable cutting operations may simultaneously be performed thereon and also to provide mechanism for efficiently removing and rerolling the material from the work table after the desired cutting operations have been performed.

While the generic inventive concept presented herein will find broad and practical utility in many other fields, the apparatus shown is specifically directed to a machine for laying out relatively long strips of fabric material which are used for finish trim on upholstery in automotive vehicle bodies. In accordance with certain improved practices in the fabrication of upholstery panels, it has been found desirable to lay out the strips of fabric finish trim material in superimposed relation in order that the material may be partially cut to form the while retaining the continuity of the strip. The present application contemplates the provision of apparatus which is not only particularly designed for smoothly laying out relatively long strips of fabric finish material, but also contemplates the provision of a machine which is particularly adaptable for re-winding the strips upon reels after the desired cutting operation has been performed thereon and the sections of material have been partially trimmed to the desired configuration.

The fabric finish strip material generally utilized for this particular purpose is provided in relatively long lengths, of a width substantially wider than the section of upholstery which it is intended to cover. It has been found necessary and desirable to lay this material out in a pile of superimposed layers in order that the cutting operations performed thereon may be performed simultaneously upon a plurality of superimposed sheets. The cutting operations generally performed on material of this type serve to shape and form the lateral edges without necessarily interfering with the continuity of the strip as a whole and consequently after these cutting operations are finished, the apparatus illustrated herein may equally well be utilized for the purpose of re-winding the strips of material upon suitable reels preparatory to their use in application upon sections of upholstery.

It is an object of the present invention to provide apparatus which is particularly simple in construction, easy to operate and which effectively serves to lay out the material in the desired manner outlined above.

Yet another object of the present invention is to provide apparatus of the type described above in which measuring feed mechanism is utilized for the purpose of feeding the cloth or fabric from the travelling carriage in order that it will be fed from the carriage at a rate proportional to the rate of movement of the carriage.

Many other and further objects and advantages of the invention will become apparent from the following specification when considered in connection with the accompanying drawing forming a part thereof.

In the drawing:

Fig. 1 is a perspective view of a device embodying the improvements of the present invention, with portions thereof broken away to facilitate the illustration; and Fig. 2 is a longitudinal sectional view taken through the device shown in Fig. 1.

With more particular reference to the drawing, the specific embodiment of the invention disclosed therein comprises a work table, generally designated as 10, supported by means of suitable legs and having a flat top 11 which is preferably of sufficient length to support the strips of cloth which are to be laid thereupon. Spaced from, and at either side of the table, are longitudinally extending trackways 12 which extend throughout the entire longitudinal length of the table and serve to support a carriage structure hereinafter described in detail.

The carriage structure comprises a pair of complemental side frame members 15, which are interconnected by means of a transversely extending tie brace 16, and each of which have journaled thereon a pair of wheels 17 on each side of the work table adapted to engage the trackway members 12 to effect a relatively friction-free movement of the carriage as a whole throughout the entire length of the work table.

The side frame members are preformed to provide two pairs of upwardly extending projections 20, which form slots therebetween, which slots are adapted to receive the shafts of reels of fabric 21 and it will be apparent from Fig. 1 that these slots permit vertical movement of the reels of fabric, the purpose and function of which will hereinafter be more clearly apparent.

Each of the reels of fabric 21 is supported upon three rollers 22, which rollers are preferably interconnected by a plurality of belts 23, which serve to form a cradle for receiving and frictionally engaging the peripheral surface of the roll of fabric material to be unreeled upon the work table.

The apparatus is operated by an electric motor 25 suitably secured to the underside of the transversely extending brace member 16. This motor serves, by means of a belt 26, to drive a transversely extending shaft 27 journaled in the side frame members 15. The shaft 27 carries at one of its outer ends a gear 28 which meshes with a pair of pinions 29, secured to the outer ends of the rollers 22. It will therefore be apparent that as the motor 26 is run, the shaft 27 and associated gear 28 will be rotated, serving to drive the pinion 29. Due to the belts 23, which interconnect the rollers 22, it will be apparent that when any one of the rollers in the cradle assembly for each of the reels 21 is driven, all of the rollers in the cradle assembly will be driven at substantially uniform speed. It will further be apparent that inasmuch as these cradle structures engage the peripheral surface of the roll of cloth 21, which is supported in each of the cradle structures, the rate at which this cloth is reeled or unreeled will be constant irrespective of the peripheral circumference thereof. Consequently, it will be seen that the cradle structures, which support the reels, serve to constitute measuring feed mechanisms, which serve to feed cloth or fabric from the rolls 21 at a substantially constant rate.

Outwardly of the gear 28 on the shaft 27 is secured a sprocket wheel 30, which serves, by means of a chain 31, to drive a sprocket wheel 32 secured to one of the wheels 17 of the carriage. It will therefore further be apparent that operation of the motor serves to move the carriage longitudinally along the work table and it will be seen that the respective gears are so proportioned that the rate of movement of the carriage along the work table and the rate of feed of fabric by the measuring feed mechanism serves to provide structure which will lay out strips of cloth from the rolls 21, smooth and flat upon the table surface. Due to the construction described above, it will also be apparent that this result will be obtained irrespective of the diameter of the rolls of cloth which are placed in the cradle structures.

The side frame members 15 are provided with downwardly extending legs which serve to support outwardly extending brackets 35 for supporting platforms 36 on either side of the work table, on which a workman may stand to operate the mechanism. A suitable switch 37 is preferably mounted on the underside of the platform 36, and is adapted to be controlled by a pair of foot pedals 38 and longitudinally extending rock shaft 39, which switch serves to control the circuit to the motor 26. The side frame members may be provided with a suitable handle or support rail 40 which will aid an operator in maintaining his position upon the platform 36.

One of the side frame members 15 is provided with a shelf-like platform 50, which serves to support an electrically operated cloth cutting mechanism 51 which has a footlike portion 52 adapted to seat on the shelf 50 and a vertically disposed cutter 53 actuated by a motor 54. The shelf 50 is preferably so disposed that the upper surface thereof is substantially level with the upper surface of the work table 11 and it will be seen that when it is desired to perform a cutting operation upon the stacked layers of fabric, the cutter 51 may be slid from the shelf on to the work table, with the foot portion 52 thereof extending in underneath the lowermost layer of cloth on the work table.

It will be appreciated that the length of travel of the carriage as a whole is confined within reasonable limits and consequently electric current may be supplied thereto by means of a suitable flexible cord, not shown.

In operation of the apparatus, a pair of reels of fabric are placed in the cradles on the machine and the carriage is operated back and forth throughout the entire length of the work table until the fabric is laid out in a relatively flat pile. The cutter mechanism may then be utilized for the purpose of trimming the edges of the strips of material, which have been stacked upon the work table, to the desired configuration, and then the apparatus may be utilized for winding the continuous strips back on the reels and the operation may be again repeated with other rolls of fabric.

From the foregoing it will be appreciated that the specific embodiment of the invention described above is merely illustrative of the generic inventive concept presented in this application. Many other and further modifications thereof falling within the scope of the appended claims will be apparent to those skilled in the art.

What is claimed is:

1. A cloth laying machine including in combination a pair of spaced frame members, a brace member interconnecting said frame members, a shaft journaled in said frame members, a motor mounted on said brace member serving to drive said shaft, rollers journaled in said frame members serving to support a reel of cloth, and means interconnecting said shaft and said rollers whereby said motor serves to unreel said cloth.

2. A cloth laying machine including in combination a pair of spaced frame members, a brace member interconnecting said frame members, a drive shaft journaled in said frame members, a motor mounted upon said brace member adapted to drive said shaft, a plurality of rollers journaled in said frame members on each side of said shaft, each of said sets of rollers serving to support a reel of cloth to be unreeled and means establishing a positive driving connection between said shaft and each of said sets of rollers.

3. A cloth laying machine, including in combination, a pair of spaced frames, a brace member interconnecting said frames, a pair of measuring feed rolls journaled for rotation in said frames forwardly of said brace member and a pair of measuring feed rolls journaled in said frames rearwardly of said brace member, a drive shaft journaled for rotation in said frames between said sets of measuring feed rolls, a motor carried by said brace member adapted to drive said shaft, track engaging wheels carried on said frames, means drivingly interconnecting one of said track engaging wheels with said drive shaft whereby said motor serves to effect rotation of said track engaging wheels, and means drivingly interconnecting said measuring feed rolls with said shaft to drive the same.

ALFRED H. HABERSTUMP.
FRANK N. CRAMER.